Sept. 4, 1945. C. G. MALMBERG 2,384,386
GASKETED JOINT
Filed June 28, 1941
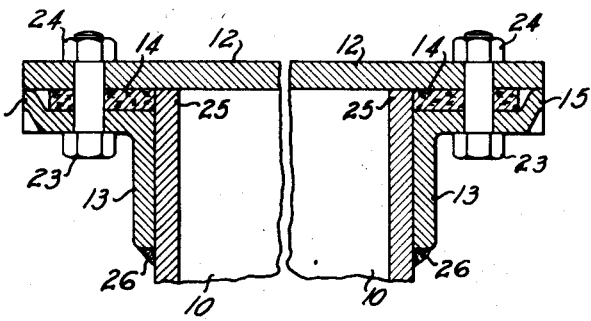
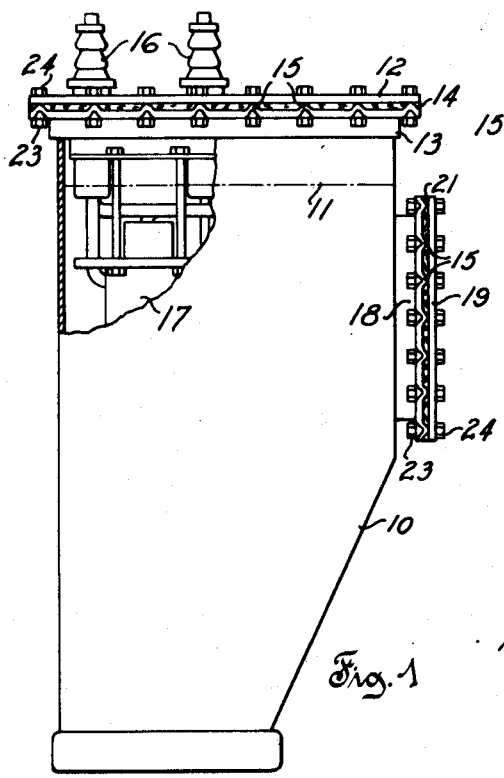
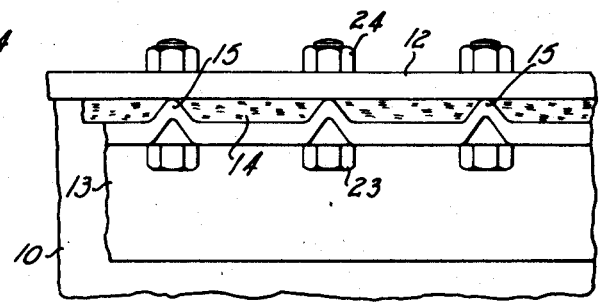
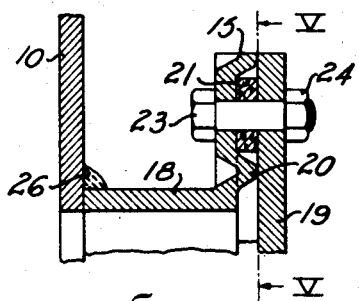
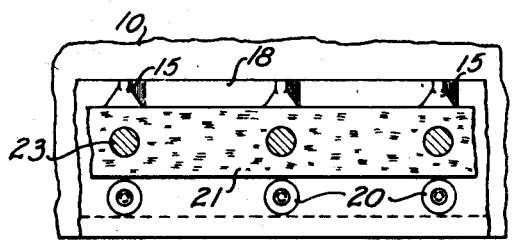
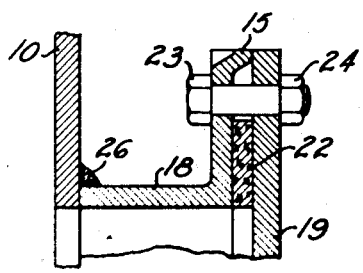
Inventor
C. G. Malmberg
by Harold A. Silver
Attorney Patented Sept. 4, 1945

2,384,386

UNITED STATES PATENT OFFICE 2,384,386

GASKETED JOINT

Carl G. Malmberg, West Allis, Wis., assignor to Allis-Chalmers Manufacturing Company, Milwaukee, Wis., a corporation of Delaware Application June 28, 1941, Serial No. 400,158

3 Claims. (Cl. 220—46)

This invention relates in general to a liquidtight joint between adjoining members having a gasket between them, and relates particularly to a new and improved means for forming a liquidtight joint between the cover and a casing of a receptacle such as may be utilized for oil immersed electrical apparatus.

It is an object of the present invention to provide a gasketed liquidtight joint in which the compression of the gasket is limited in a new and improved manner.

It is another object of this invention to provide stops for limiting the gasket compression in a liquidtight joint by forming spaced protuberances on one of the joined members.

It is another object of the present invention to provide a gasketed liquidtight joint with a gasket retaining means which also forms stops only at the fastening points of the joint.

It is a further object of this invention to provide a gasketed casing joint with a gasket retaining means which also forms stops for limiting gasket compression without utilization of added material.

It is a further object of this invention to improve a liquidtight joint so that it may be simply and inexpensively manufactured and so that it may present a better appearance.

Objects and advantages other than those above set forth will be apparent from the following description when read in connection with the accompanying drawing, in which:

Fig. 1 is an elevational view of a transformer casing, with a part of the casing broken away, embodying the present invention;

Fig. 2 is an enlarged broken sectional view through the casing and cover of the transformer shown in Fig. 1;

Fig. 3 is an enlarged elevational view of the casing and cover shown in Fig. 1;

Fig. 4 shows a modification of the invention shown in Figs. 1, 2 and 3;

Fig. 5 is an end sectional view taken on the line V—V of Fig. 4; and

Fig. 6 illustrates another modification of the invention shown in Figs. 1, 2 and 3.

The casing 10 is shown in Fig. 1 as enclosing transformer winding 17 immersed in oil or similar insulating liquid to a level shown at 11. A top cover 12 through which the bushings 16 extend and a side hand hole cover 19 are held against the casing 10 by means of bolts 23 and nuts 24 to form a liquidtight joint.

As shown more clearly in Figs. 2 and 3, the casing 10 has a flange which may be a bent edge of the casing wall or may be a separate member 13 fastened to the casing near the top edge thereof as by the welds 26 shown. Between the horizontal portion of the flange 13 and the top cover 12 is a gasket 14 of any suitable material such as cork.

Protuberances 15 are formed at the outer edge of the horizontal portion of flange 13. These protuberances are simply and cheaply made by denting with a punch and die or otherwise stamping or rolling the flange 13, preferably before it is welded to the casing 10. Where the stops 15 are referred to herein as protuberances projecting from one of the joining members, such terms define a structure formed of the material present, that is, by denting, stamping, rolling or the like, as distinguished from machining the material present or as distinguished from the addition of more material as by welding, brazing or the like. These protuberances 15 are formed adjacent each bolt 23. In this manner stops are formed only where needed, that is, at the point at which the fastening bolts 23 apply pressure to the cover and flange.

In the embodiment shown in Figs. 2 and 3, which may be utilized where the cover is relatively large, the top portion 25 of the walls of casing 10 is also utilized as a stop. The flange 13 is welded to the casing 10 a distance below the top of the casing wall equal to the height of the stops 15. This prevents depressing of the center of the cover by the clamping action of the bolts 23. As shown clearly in Figs. 2 and 3, a tightening of the nuts 24 can compress the gasket 14 only until the cover 12 stops against the protuberances 15 and the portions 25.

The use of the protuberances 15 provides definite advantages. It avoids the necessity of welding or otherwise forming an additional strip on the flange or cover, thus saving the expense of the additional material. The denting or stamping operation is cheaper from a manufacturing standpoint than is a welding operation. The welding operation does not provide the satisfactory and pleasing appearance of the present construction because the bead of weld metal is rough and irregularly rippled. The protuberances 15 also provide a gasket retaining means.

As stops, the protuberances 15 limit the compression of gasket 14 to a predetermined value. This prevents exceeding the elastic limit of the gasket material and assures a tight joint. In forming the stops 15, for example, with a punch and die, it is a simple matter to maintain accuracy within necessary tolerances. By providing metal to metal stops, relative movement of the metal due to flexibility of the gasket is prevented, which movement may cause rupture of the gasket.

In the modification shown in Figs. 4 and 5, additional protuberances 20 are formed adjacent the inner edge of gasket 21. In this modification the gasket is retained in place by the formed stops and by the bolts 23 which extend through the gasket. The structure of this modification is shown as applied to the joint between the flange 18 and the cover 19 of the side hand hole of the transformer casing 10. The stops 20 in this modification have a function similar to that of the upper portion 25 of casing 10 in Figs. 2 and 3. The elements of this joint otherwise function in a manner similar to their function in the modification shown in Figs. 2 and 3.

Fig. 6 shows a modification which may be utilized where the cover 19 has considerable stiffness or where the opening is not large. A single line of stops 16 is formed on the flange 18 at the outer edge thereof. The gasket 22 may be placed inside of the fastening bolts 23 as shown.

While the various modifications have been illustrated in connection with either the top or side cover, it is obvious that any of the modifications or combination of the elements thereof can be used with either cover or at any casing joint. Although protuberances have been described as being on the receptacle or a flange fastened thereto, they could instead be applied to the cover.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, two relatively joining members comprising a receptacle provided with an opening therein and a cover for said opening, a continuous flange on one of said members surrounding said opening, gasket material between said members, fastening means for forcing said members together and for compressing said gasket material, and means for spacing said members and for limiting compression of said gasket material to a predetermined value, said last named means comprising stops in the form of spaced portions of one of said members integral therewith and projecting from one side thereof in the form of protuberances having corresponding indentations at the opposite side of said member, said protuberant stops being positioned within the perimeter of said flange.

2. In combination, two removably assembled joining members one of which comprises a receptacle provided with an opening therein, a continuous flange on one of said members surrounding said opening, gasket material between said members, easily detachable fastening means for forcing said members together and for compressing said gasket material, and means for spacing said members and for limiting the compression of said gasket material to a predetermined value, said means comprising stops in the form of spaced portions of one of said members integral therewith and projecting from one side thereof in the form of protuberances having corresponding indentations at the opposite side of said member, said protuberant stops being positioned within the perimeter of said flange.

3. In combination, two relatively joining members comprising a receptacle provided with an opening therein and a cover for said opening, a continuous flange on one of said members surrounding said opening, gasket material between said members, fastening means comprising cooperating elements in threaded engagement for forcing said members together and for compressing said gasket material, and means for spacing said members and limiting compression of said gasket material to a predetermined value, said means comprising stops in the form of spaced portions of one of said members integral therewith and projecting from one side thereof in the form of protuberances, the material of said protuberances being of a thickness substantially the same as the thickness of the material in the nonprotuberant portion of said member, said protuberant stops being immediately adjacent each of said pairs of fastening elements.

CARL G. MALMBERG.